United States Patent
Kojima (10) Patent No.: US 6,865,146 B2
(45) Date of Patent: Mar. 8, 2005

(54) SIGNAL RECORDING MEDIUM, SIGNAL RECORDING METHOD, SIGNAL RECORDING APPARATUS, AND SIGNAL RECORDING/REPRODUCING APPARATUS

(75) Inventor: Tadashi Kojima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 09/939,685

(22) Filed: Aug. 28, 2001

(65) Prior Publication Data
US 2002/0031063 A1 Mar. 14, 2002

(30) Foreign Application Priority Data
Aug. 28, 2000 (JP) ........................................ 2000-258217

(51) Int. Cl.$^7$ .............................. G11B 5/09; G11B 7/24
(52) U.S. Cl. ................................ 369/53.29; 369/275.4; 369/47.27
(58) Field of Search .............................. 369/275.4, 94, 369/53.12, 53.28, 53.29, 53.31, 53.35, 47.27, 47.31, 47.54, 30.1, 30.12, 44.28, 44.26, 275.3, 96, 277, 283, 13.55

(56) References Cited

U.S. PATENT DOCUMENTS

| | | | | |
|---|---|---|---|---|
| 5,251,198 A | * | 10/1993 | Strickler | ........................ 369/94 |
| 6,118,753 A | * | 9/2000 | Keshner et al. | .......... 369/275.3 |
| 6,269,071 B1 | * | 7/2001 | Van Den Enden et al. | ........................ 369/275.4 |
| 6,335,070 B1 | * | 1/2002 | Tomita | ..................... 369/275.4 |
| 6,541,186 B2 | * | 4/2003 | Sato et al. | ................ 369/275.3 |

FOREIGN PATENT DOCUMENTS

| | | |
|---|---|---|
| JP | 10-334573 | 12/1998 |
| JP | 11-25467 | 1/1999 |
| JP | 11-66576 | 3/1999 |

* cited by examiner

Primary Examiner—Thang V. Tran
(74) Attorney, Agent, or Firm—Oblon, Spivak, McClelland, Maier & Neustadt, P.C.

(57) ABSTRACT

A signal recording medium has a plurality of recording layers. Each recording layer has tracks for recording information. The tracks have a wobbling structure in which they are wobbled at different periods for the respective recording layers. Appropriate processing can be performed for a target recording layer by monitoring the wobbling period of the track.

14 Claims, 5 Drawing Sheets

First embodiment
  First layer
  Second layer

Second embodiment
  First layer
  Second layer

FIG. 9

SIGNAL RECORDING MEDIUM, SIGNAL RECORDING METHOD, SIGNAL RECORDING APPARATUS, AND SIGNAL RECORDING/REPRODUCING APPARATUS

CROSS-REFERENCE TO RELATED APPLICATIONS

This application is based upon and claims the benefit of priority from the prior Japanese Patent Application No. 2000-258217, filed Aug. 28, 2000, the entire contents of which are incorporated herein by reference.

BACKGROUND OF THE INVENTION

1. Field of the Invention

The present invention relates to a recording medium having tracks for recording information. The present invention also relates to a signal recording method and apparatus for recording a signal on the signal recording medium. The present invention also relates to a signal recording/reproducing apparatus for recording a signal on the signal recording medium and reproducing the signal from the signal recording medium.

2. Description of the Related Art

As a recording medium used for recording and reproduction, an optical disk is known. Such a recording medium has a recording surface (or recording layer). The recording surface has spiral tracks. A signal is recorded in a track groove (groove) or between a track groove and another track groove (land). Examples of a recording medium for recording a signal in a groove are a CD-R, CD-RW, DVD-R, and DVD-RW. An example of a recording medium for recording a signal on both a groove and a land is a DVD-RAM. In actually recording a signal, a mark corresponding to the signal is formed on a track by a laser beam.

Tracks on a recording medium are wobbled. When wobbling on a track is detected, a wobbling signal is obtained. A reference clock for a signal write can be obtained using the wobbling signal as a reference phase. More specifically, a write reference clock can be generated using an oscillation output equivalent to a signal obtained by frequency-multiplying the wobbling signal) from a PLL (phase-locked loop circuit) phase-locked to the wobbling signal.

With this method, a predetermined recording density can be obtained independently of the linear speed of the recording beam. In addition, even before the rotational speed of the disk reaches the fundamental speed, a signal write can be started. These effects are remarkable and employed as a recording scheme for various kinds of recording media described above. A CD-R or CD-RW uses a wobbling signal as a carrier wave and modulates and records a physical position signal. When the wobbling signal is detected, the physical address can be detected and used for search for information recording/reproduction.

The recording capacity of an optical disk has increased from a CD system using a laser wavelength of 780 nm to a DVD system using a waveform of 650 nm. A next-generation optical disk using a violet laser beam with a wavelength of 405 nm has been recently researched and developed. In this research and development, measures have been sought which make a recording mark small using a smaller laser beam diameter and consequently greatly improve the recording density and recording capacity. As another technique, a disk having stacked recording layers has also been researched and developed. A recording layer with a multilayered structure has already been employed by a DVD-ROM as a read-only disk. A rewritable RAM disk can also improve the recording capacity by employing this technique.

Currently available DVD optical disks are a DVD-RAM, DVD-R, and DVD-RW. A DVD optical disk can record a 4.7-GB digital signal on one surface of a 12-cm diameter disk. A DVD-ROM as a read-only disk has already implemented a two-layered structure on one surface and has a capacity of 9 GB on one surface. A recording medium with a two-layered structure has already been realized at the laboratory level and is expected to be put into mass production soon. In such a two-layered disk, to identify a recording layer subjected to recording and reproduction, layer identification information must be embedded in advance. Conventionally, a method of inserting layer identification information into control information data has been employed.

For example, in a DVD, ID information of each sector contains data "layer number" as "sector information". The recording layer subjected to recording and reproduction can be identified by reading the "layer number". However, in recognizing the contents of "sector information", a read block is read in a sector synchronous state, error-correcting processing is executed, and then, the contents are recognized. If an inter-layer jump occurs or recording operation is to be quickly stopped, the necessary layer identification information cannot be detected at early time.

In a DVD-ROM system, an inter-layer jump can abruptly occur do to a defect or vibration during reproducing operation. When such inter-layer jump occurs, read data is demodulated as reliable data by error correction and the like, and after that, it is determined on the basis of an ID or the like contained in the read data whether the data is desired information. If it is determined that the data is not desired information, the information is discarded, and re-read operation is executed. This only requires an extra read time and poses no other problem.

However, if an inter-layer jump occurs during recording operation in the recording/reproducing system, recorded correct data is destroyed, resulting in serious problem. If an inter-layer jump occurs due to an operation error, and large block data, e.g., large data that cannot be error-corrected is destroyed, the block data cannot be restored. That is, when a recording error occurs to cause movement to another track due to an operation error, it is preferable to detect the recording error state and stop the recording operation at early stage while the error remains within the error-correcting ability of the system.

BRIEF SUMMARY OF THE INVENTION

During recording operation on a recording medium, physical recording position detection and a measure against a sudden track jump must be completely executed. Recording start position detection can be realized by multiple-detecting the constituent items of the physical structure of the system. However, a jump to another track due to various kinds of defects or vibration can hardly be prevented. It is therefore important to detect resultant jump operation and stop the recording operation at early stage so as to minimize any damage (destruction of recorded data).

A signal recording medium of the present invention has tracks wobbled at different periods for the respective recording layers.

A signal recording medium of the present invention has tracks wobbled at different periods every round.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

Jump to another track (including inter-layer jump) generally exhibits a large tracking error signal as a behavior. For this reason, a track jump can be detected by monitoring a tracking error signal. However, track jump detection is not always possible only by a tracking error signal. Track jump detection sometimes becomes impossible depending on the contents of a defect or the like. That is, even when a track jump occurs, the tracking error signal does not always largely change. To surely detect a jump, it must be detected using another signal after the jump that the current position is different from the track position at the time of recording.

The present invention places an emphasis on a wobbled track structure which is employed by a recording/reproducing medium as a general recording track structure and is readily used for recording rate control.

A signal recording medium of the present invention has tracks wobbled at different periods for the respective recording layers. When a wobbling signal obtained from the track is monitored, the presence/absence of a track jump between the layers can be instantaneously detected.

A signal recording medium of the present invention has tracks wobbled at different periods every round. When a wobbling signal obtained from a track is monitored, the presence/absence of a track jump to a track of another round can be instantaneously detected.

With this method, even when an unexpected track jump occurs during recording operation to cause a recording error, the recording operation can be stopped by detecting the track jump at early stage. In addition, when the recording error portion is read, error correction is executed, and correct data is recorded again, the recording error portion can be restored. That is, according to this method, data destruction can be prevented.

In the present invention, the presence/absence of a jump can be instantaneously detected by changing the wobbling signal every round of a track, for a plurality of tracks, or every zone.

According to the present invention, in a method and apparatus for recording or reproducing a signal on or from the above-described recording medium, a wobbling signal is monitored, and when the wobbling signal changes during actual recording operation, the recording operation is instantaneously stopped.

In the present invention, even when a track jump occurs, and data is erroneously overwritten on part of the area at the jump destination, correct data can be rewritten by reading the data at this portion and executing error correction because the overwrite amount is small. Hence, data destruction by the apparatus itself can be reduced, and the reliability of the apparatus can be greatly improved.

A signal recording medium, recording/reproducing method, and recording/reproducing apparatus according to an embodiment of the present invention will be described below with reference to the accompanying drawing.

A conventional recording/reproducing optical disk has spiral track grooves formed from the inner periphery. When a recording mark is formed on a track groove, i.e., a groove by a laser beam, a signal is recorded. In this method, using heat by a laser beam, the reflectance/absorbance of the photosensitive organic substance of a recording medium is changed or the recording medium is phase-changed (crystallized or non-crystallized) by liquefaction, thereby forming a recording mark to record a signal.

Typical recording medium products are a CD-R, CD-RW, DVD-R, DVD-RW, DVD-RAM, and the like. On signal recording tracks of such a recording/reproducing optical disk, grooves are generally wobbled (zigzagged) to obtain a predetermined recording density. In recording a signal, a recording/reproducing apparatus detects a wobbling signal obtained from a wobble and frequency multiplies the signal, thereby generating a write clock. That is, the wobbling signal is supplied to a PLL (phase-locked loop circuit), and the oscillation output (equivalent to a signal obtained by frequency-multiplying the wobbling signal) from the PLL circuit is phase-locked to the wobbling signal. A write reference clock is generated using the oscillation output.

In a CD-R or CD-RW, a wobbling signal is used as a carrier wave, and a physical ID such as position information on the disk or the like is recorded in advance by a bi-phase modulation scheme in the disk manufacturing process. Hence, an apparatus for writing a signal on such a disk can recognize the current position by detecting a wobbling signal and demodulating the position information by an ID demodulation circuit. However, this information intermittently appears and cannot be demodulated unless a specific wobbling signal (physical ID) is detected. Hence, a predetermined track distance is required for the first detection cycle to the next detection cycle.

Figure 1A:
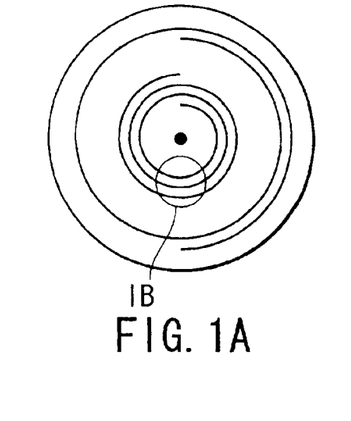
FIGS. 1A and 1B are views showing the structure of wobbled grooves of an optical disk.
Figure 1B:
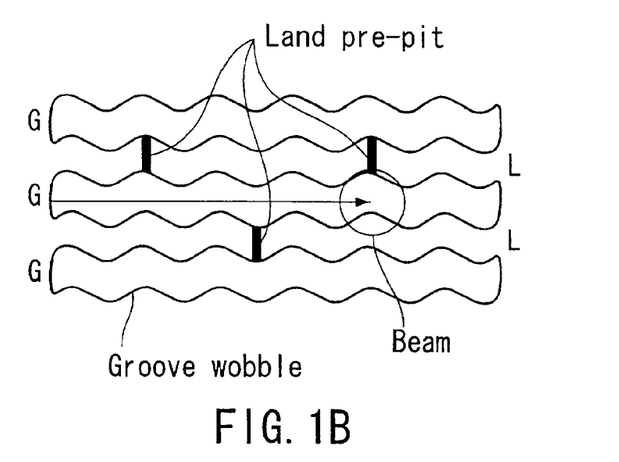

FIGS. 1A and 1B are views showing the relationship between the track structure and a wobbling signal of a disk. Groove tracks are spirally formed for the inner periphery. Grooves G are wobbled. In a DVD-R or DVD-RW, a physical ID as position information is realized by forming a plurality of marks called pre-pits in land regions (between grooves). The plurality of pre-pits are separated by a predetermined distance. ID information is represented on the basis of the positional relationship between the pre-pits.

Figure 2A:
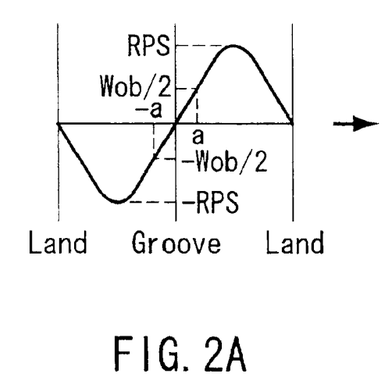
FIGS. 2A and 2B are a graph and view, respectively, showing a wobbling signal and a groove wobble.
Figure 2B:
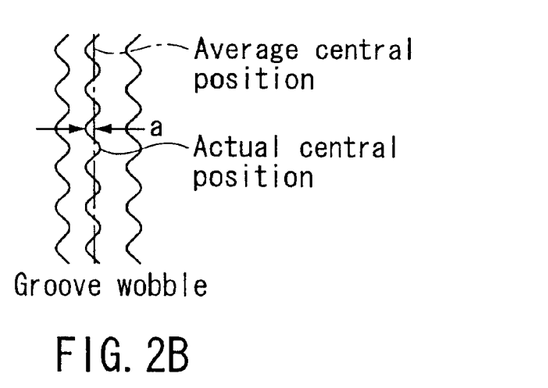

FIG. 2A shows the signal level of a wobbling signal for the push-pull tracking error signal characteristic of a DVD-R. FIG. 2B shows the wobble structure. A push-pull tracking error signal (PP signal) is related to tracking control of an optical pickup (PUP).

When a beam radially crosses from the land center to the next land center, the PP signal exhibits an S-shaped characteristic. The wobble amount of a groove equals the amount of movement to the "±a" position of the S-shaped characteristic and corresponds to the zigzag portion of the groove.

FIG. 2B shows a state wherein the average center shifts from the actual groove center by "a". Generally, "a" is about 2% the peak-to-peak amount of the S-shaped characteristic. The frequency response characteristic of a tracking servo is much lower that the frequency band of the wobbling signal. For this reason, a beam from an optical pickup moves on the average center. On the other hand, when a bandpass filter is used, the wobbling signal is detected from the PP signal.

Since a recording mark is formed at the average center, the wobbling signal rarely affects the recording signal.

Figure 3A:
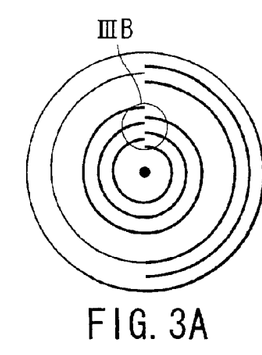
FIGS. 3A and 3B are views showing the structure of wobbled grooves of another optical disk.
Figure 3B:
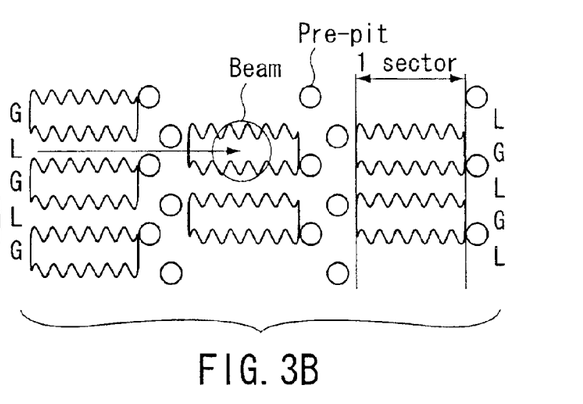

FIGS. 3A and 3B are views showing groove wobbles of a DVD-RAM.

A DVD-RAM employs a groove/land recording scheme. Especially, the random access performance is improved. For this purpose, a data recording region is segmented into sectors and pre-pits are formed between the sectors such that user data can be recorded/reproduced every 2-Kbyte sector. A clock generation signal necessary for phase information ID or recording/reproduction is formed by the pre-pits.

In a DVD-R, pre-pit are distributed to the whole sector regions. In a DVD-RAM, pre-pits re formed at the boundaries between lands and grooves between the respective sector regions. The lands and grooves are switched every round, thereby forming a continuous recording track. That is, data is recorded on a land through a round and then recorded on a groove through a round, thereby allowing continuous layout of recorded data.

Both the DVD-R shown in FIGS. 2A and 2B which employs the groove recording scheme and the DVD-R shown in FIGS. 3A and 3B which employs the land/groove recording scheme are formed by wobbling the grooves. When the disk is used for recording/reproduction, a recording/reproducing apparatus can generate a write clock as a reference by detecting a wobbling signal. Position information on the disk is formed from a plurality of distributed pre-pits in the DVD-R shown in FIGS. 2A and 2B. In the DVD-RAM shown in FIGS. 3A and 3B, the position information on the disk can be detected from pre-pits formed between the sector regions. However, either scheme can obtain the position information only for each sector.

Before a description of the present invention, information data recording operation of a DVD will be described with reference to FIGS. 4 to 7.

Figure 4:
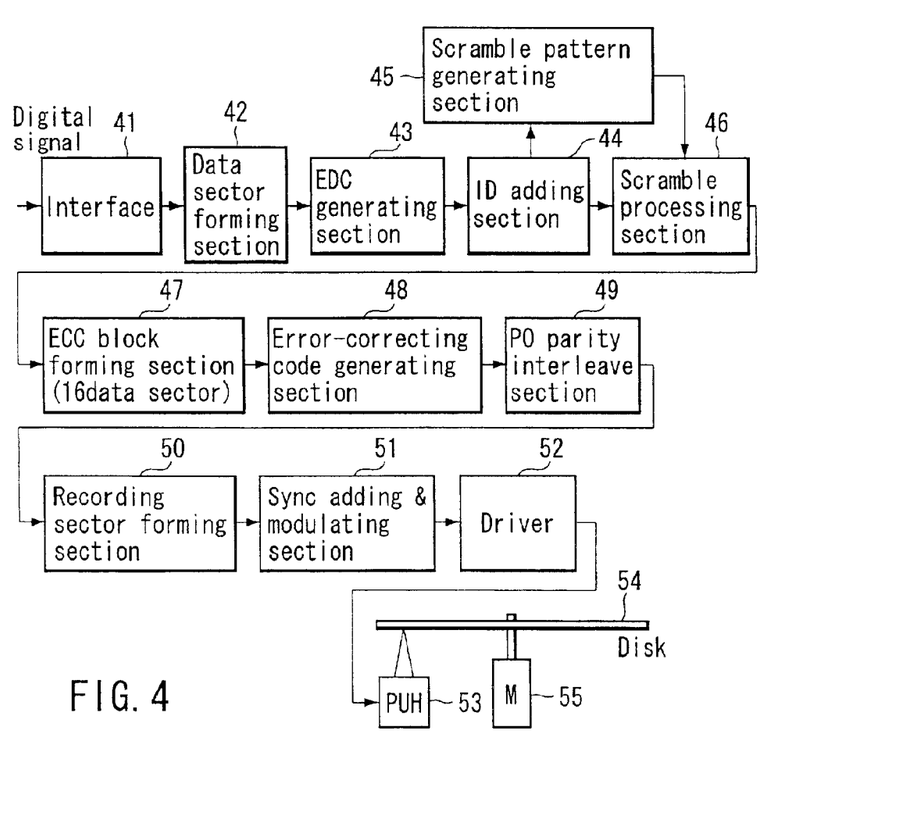
FIG. 4 is a block diagram for explaining the data processing process of a recording apparatus.

FIG. 4 is a block diagram showing the data processing process of a recording apparatus complying with the DVD standard. A digital signal from an external device is guided to a data sector forming section 42 through an interface 41 and segmented into 2-Kbyte sectors. An error-correcting/detecting code (EDC) is added to the sector data by an error-detecting code generating section 43. An ID adding section 44 adds a sector ID to the user data portion of each sector. A scramble pattern generating section 45 generates a scramble signal determined by the contents of the ID. Only the user data portion is scrambled by a scramble processing section 46.

This scramble processing aims at preventing any disturbance for a servo error signal due to crosstalk between adjacent tracks when data with the same pattern are repeated.

After that, to generate a parity signal for error-correcting processing, an ECC block forming section 47 forms ECC blocks. In the DVD, an ECC block is formed from 16 sectors. An error-correcting code generating section 48 generates an error-correcting code (outer code PO and inner code PI) for each ECC block. The outer code parity PO is interleaved to the final row of each of the 16 sectors and added to each sector by an interleave section 49. The inner code PI is added next to the final column of each of the 16 sectors. With this processing, a recording sector is formed by a recording sector forming section 50. After that, sync signal addition and modulation are executed by a sync adding & modulating section 51 to generate a write signal. The signal is written on a disk 54 through a driver 52 and pickup head (PUH) 53. The disk 54 is rotated by a disk motor 55.

Figure 5:
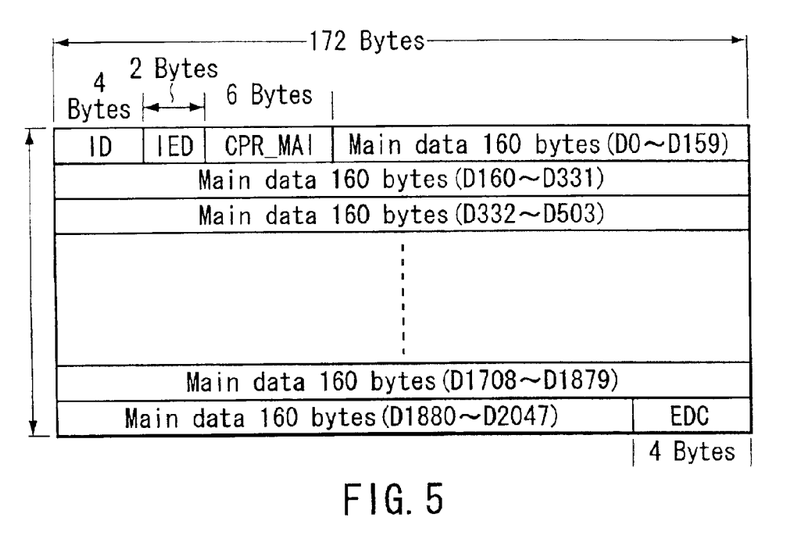
FIG. 5 is a view showing the structure of the data sector of a DVD.
Figure 6:
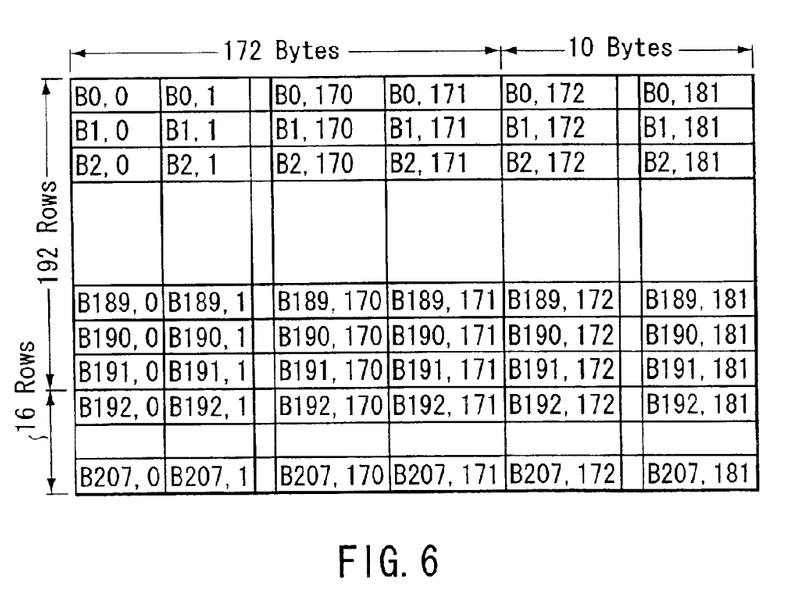
FIG. 6 is a view showing the arrangement of the ECC block of a DVD.
Figure 7:
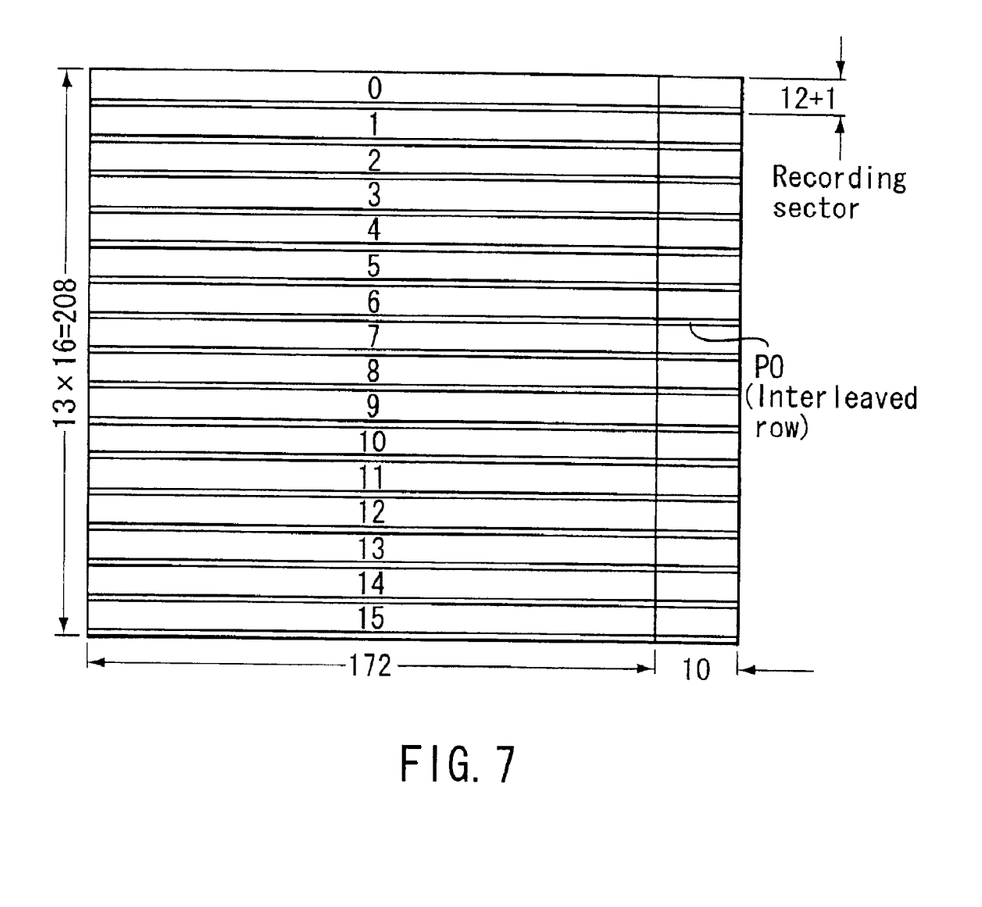
FIG. 7 is a view showing the ECC block of a DVD after row interleave of an outer code.

FIG. 5 is a view showing the data sector structure. FIG. 6 is a view showing the ECC block. FIG. 7 is a view showing a state wherein recording sectors are put together into an ECC block, and the outer code PO is interleaved.

A DVD employs a "product code" as an error-correcting code, as is apparent from FIGS. 4 to 7. Ten parities are generated and added to the 172-byte row data as the inner code PI, and 16 parities are generated and added to the 192-byte column data as the outer code PO. When such a code is employed, error-correcting/detecting processing using the inner code PI is executed for a reproduced signal, thereby indicating an error position. Next, in error-correcting/detecting processing using the outer code PO, the error pattern at the indicated error position is corrected by arithmetic generation (erasure correction). With the error-correcting/detecting processing, an error up to 16 bytes (an error up to 16 rows) can be corrected. For this reason, an error up to 1.3 sectors can be corrected. However, if continuous errors occur, there is no guarantee that the remaining portions are free of errors and one must generally assume that an error occurs at a certain probability. Processing need be executed not to generate continuous errors beyond a 0.5 sector.

Under these circumstances, when data is being recorded on an optical disk having two recording layers, an inter-layer jump may occur due to vibration or the like. Especially, in the two-layered disk, the distance between the layers is about 40 to 60 $\mu$m for a 650-nm laser and about 10 to 20 $\mu$m for a 400-nm laser, although it changes depending on the laser wavelength to be used and the optical characteristics of the disk material. For this reason, if the focus error signal has disturbance by a small defect, and vibration is added to this situation, an inter-layer jump occurs. If the focus error signal has disturbance, the inter-layer jump cannot be determined by the focus error signal.

After the jump, recording operation is continuously performed for a recording track of a wrong layer (a layer different from the target layer). The problem is still insignificant if the track of the wrong recording layer is an unrecorded track. However, if it is a recorded track, data that has been correctly recorded is destroyed.

To solve this problem, if a jump to a wrong track (a track different from the target track) occurs, that the track is not the target track is preferably detected at early time. In the conventional structure, however, since information representing the position is generally only written as an ID signal, i.e., data, necessary information cannot be obtained unless the data is read and demodulated at the jump destination. For example, in the disk shown in FIGS. 1A and 1B, pre-pits of sector data are distributed to the recording region of one sector. In the disk shown in FIGS. 3A and 3B, the position information cannot be obtained unless the pre-pit portions are read. Especially in the disk shown in FIGS. 3A and 3B, if a jump to the start portion of the recording region of the counterpart layer occurs during recording, one sector (already recorded data) is wholly destroyed. This is because an overwrite is executed before the next pre-pit is read and determined.

To solve this problem, the present invention provides a method of detecting that a movement error of a recording track occurs at early stage (instantaneously) using a wobbling signal.

Figure 8:
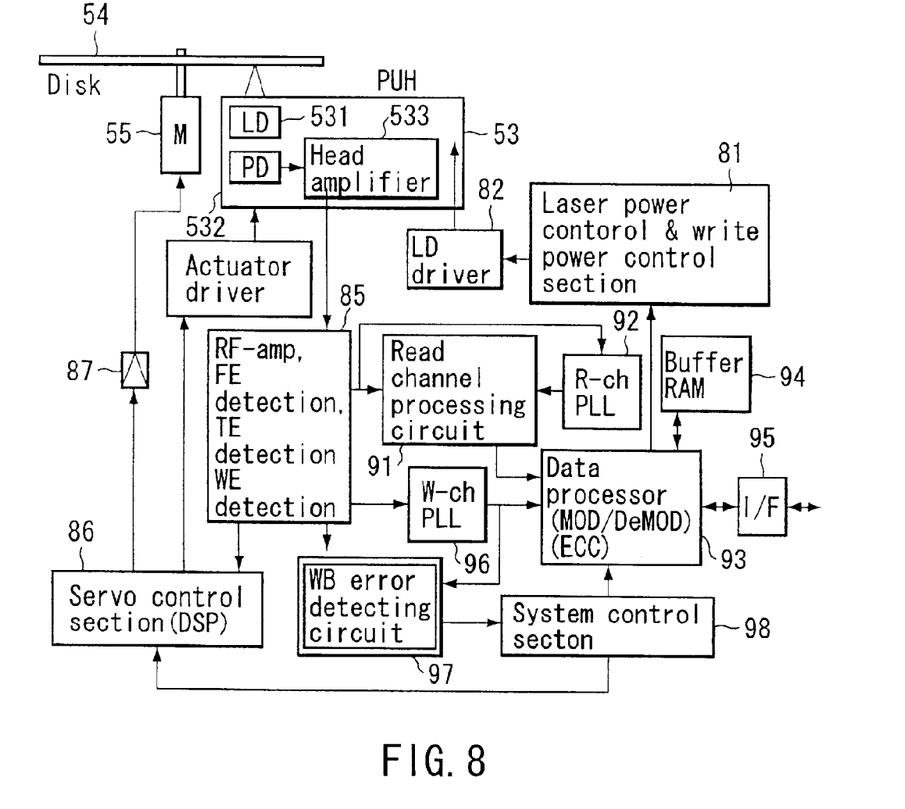
FIG. 8 is a view showing the arrangement of a recording/reproducing apparatus using the present invention.

FIG. 8 is a view showing the arrangement of a recording/reproducing apparatus using the present invention.

The disk 54 is irradiated with light output from a laser diode 531 of the optical pickup head (PUH) 53 through an optical system. Reflected light from the disk 54 is converted into an electrical signal by a photodetector 532 and head amplifier 533 and sent to a signal detecting section 85. The signal detecting section 85 has an RF amplifier, servo error signal detector, and wobbling signal detecting section. Examples of the servo error signal are a focus error (FE) signal and tracking error (TE) signal.

The focus error signal and tracking error signal as servo error signals are sent to a servo control section 86 (formed from a digital signal processor (DSP)) and subjected to optimum equalization to control the objective lens of the PUH or the PUH feed motor through an actuator driver 88. As a result, a desired track is stably irradiated with the laser beam.

In addition to the above operation, a wobbling (WB) signal is also detected and sent to a write channel PLL (W-ch PLL) circuit 96. A write clock is generated for the oscillation output from the PLL circuit 96. The clock generated by the PLL circuit 96 is sometimes used to quickly execute lock operation for a read clock generated by a read channel PLL (R-ch PLL) circuit 92.

In data write operation, a data processor 93 adds an error-detecting code (EDC) and ID to the data received through an interface (I/F) 95 using the write clock generated by the write channel PLL circuit 96. Next, data scramble processing is executed for stable servo. An error-correcting code (ECC) is then added. Next, simultaneously with addition of a sync signal, the signal other than the sync signal is modulated. The resultant signal is sent to a laser power control & write power control section 81. An LD driver 82 is driven by a write strategy optimum for a corresponding medium to write the signal on the medium.

In reading a signal from the disk 54, an RF signal obtained from the head amplifier 533 of the optical pickup head (PUH) 53 is sent to a read channel processing circuit 91 and read channel PLL circuit 92. The read channel processing circuit 91 extracts channel data on the basis of the read clock generated by the read channel PLL circuit 92.

The read channel data is synchronized by the data processor 93 to read symbol data. After that, error correction and descrambling are executed, and the data externally requested is transferred through the I/F 95.

In such read/write processing and, more particularly, in the write operation, even if an inter-layer jump (or track jump) occurs due to a defect or vibration, no problem is posed as long as the inter-layer jump (or track jump) can be detected on the basis of disturbance of the tracking error signal or focus error signal. However, even when the phenomenon can be detected, it may be difficult to confirm the jump to another track. In this case, how to proceed with the subsequent write operation cannot be determined.

To solve this problem, the apparatus of the present invention shown in FIG. 8 has a wobbling signal error detecting circuit 97. Since the pattern of the wobbling signal changes depending on the recording layer, movement to another track can be quickly determined by detecting a change in wobbling signal. That is, in executing recording/reproducing processing for a target recording layer, the wobbling period of the track is continuously detected. If a change in wobbling period is detected by the wobbling signal error detecting circuit 97, movement from the target recording layer can be detected. At this time, the recording/reproducing operation is stopped by a system control section 98.

Conventionally, the movement can be detected on the basis of an ID read on the read channel side. However, the ID is recorded only for each sector, and quick detection is impossible.

In the apparatus shown in FIG. 8, however, since a difference in wobbling signal is used, an error can be detected within a data length corresponding to about 1 row in FIG. 6, i.e., an error can be instantaneously detected. Even when the beam position moves to another track due to an inter-layer jump or the like, any recording operation error can be minimized.

The detection result from the wobbling signal detecting circuit 97 is transferred to the system control circuit 98. When the wobbling signal has, e.g., a phase that is different from the preceding phase, the system control section 98 determines that an inter-layer jump (or track jump) has occurred, and sends an error signal to the servo control section 86 and data processor 93. With this operation, the write operation of the recording apparatus is immediately stopped. A buffer RAM 94 is connected to the data processor 93 and used to temporarily store data.

Figure 9:
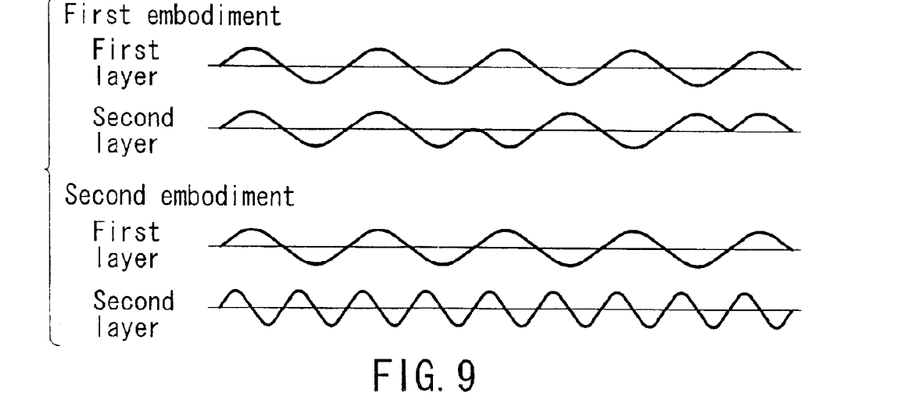
FIG. 9 is a view showing a wobbling signal in each layer of the present invention.

FIG. 9 is a view showing embodiments of the wobbling signal in each layer of the optical disk of the present invention. In the first embodiment shown in FIG. 9, the wobbling signal of the first layer is a signal having a single frequency, and the wobbling signal of the second layer is a signal whose phase is inverted every two cycles. In the second embodiment shown in FIG. 9, the frequency of the wobbling signal is changed between the first and second layers.

Since the characteristic of the wobbling signal is changed between the layers, an inter-layer jump can be quickly detected. If an error is detected during a write operation, the write operation can be quickly stopped, and destruction of recorded correct data at the jump destination can be minimized.

If data is erroneously written in part of the track at the jump destination, the block of the precedingly written data is read and rewritten after error correction, thereby restoring the destroyed data.

The present invention is not limited to the above-described contents. That is, the present invention is not limited to the function of stopping the recording operation when the system control section 98 detects an error during actual recording operation. When an inter-layer jump or track jump occurs, an overwrite may be executed on data that has already been recorded at the jump destination. In the present invention, however, since an error is instantaneously detected, the overwritten amount is small. Hence, a function of reading the already recorded data that is partially destroyed by the overwrite, executing error correction, and writing the data at the original position again may be prepared. With this function, the data at the erroneously recorded portion can be restored, data destruction can be prevented, and the reliability of the apparatus can be considerably improved.

When recording processing is temporarily stopped, how to process the data to be recorded poses a problem. This apparatus has a means for, after the data is restored, returning the beam position to the normal track position and rewriting the data to be recorded. The apparatus always has a buffer memory in the write data system, and the buffer memory stores the data to be recorded. Normally, the data to be recorded is stored in the buffer memory before the write of the data to be recorded is ended. Hence, after data restoration, the apparatus starts processing of returning the beam position to the correct track and recording the data to be recorded.

The present invention is not limited to the above embodiments. In the above description, the form of the wobbling signal is changed between the layers. However, the form may be changed not only between the layers but also every round of a track. The form of the wobbling signal may be changed for a plurality of tracks (zones). Alternatively, the form of the wobbling signal may be changed both between the layers and every round of a track (or for a plurality of tracks). For example, when the tracks are wobbled at different periods every round of a track, the recording/reproducing operation is controlled in the following manner. When recording/reproducing processing is to be executed for the nth track, the wobbling period of the track is continuously detected. If a change in wobbling period is detected by the wobbling signal error detecting circuit 97, movement from the nth track can be detected. At this time, the recording/reproducing operation is stopped by the system control section 98.

The form of the wobbling signal can be changed in various ways by, e.g., changing the pattern, frequency, or the like.

The recording apparatus must recognize the forms of the wobbling signal of the mounted disk and the form of the combination. In the present invention, identification information representing the wobbling signal form is described in the lead-in area of the disk or an area of the user data area where control information is described. The recording apparatus reads and stores the wobbling signal form identification information in advance, thereby setting wobbling determination operation and detecting an error when a jump occurs. In the wobbling determination operation, what kind of form is detected when a jump (inter-layer jump or track jump) from the current wobbling signal form occurs is determined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A signal recording medium having a plurality of recording layers,
   each of said recording layers having tracks for recording information, and
   said tracks having a wobbling structure in which said tracks are wobbled at different periods for the respective recording layers,
   wherein said recording layers comprise a reference layer and another layer, said reference layer having tracks wobbled at a predetermined period and said other layer having tracks phase-modulated at a specific period.

2. A medium according to claim 1, wherein the wobbling periods of said tracks of said recording layers have a multiple relationship.

3. A medium according to claim 1, wherein said tracks comprise land tracks and groove tracks, and a signal is recorded on only said groove tracks.

4. A medium according to claim 1, wherein said tracks comprise land tracks and groove tracks, and a signal is recorded on both said land tracks and said groove tracks.

5. A signal recording method of recording a signal on a signal recording medium having a plurality of recording layers, each of the recording layers having tracks for recording information, and the tracks having a wobbling structure in which the tracks are wobbled at different periods for the respective recording layers, comprising:
   in recording the signal on a target recording layer of the signal recording medium, detecting the wobbling period of the track parallel to signal recording, and upon detecting a change in wobbling period during signal recording, determining on the basis of the detection result that movement from the target recording layer occurs, and stopping the recording operation.

6. A signal recording apparatus for recording a signal on a signal recording medium having a plurality of recording layers, each of the recording layers having tracks for recording information, and the tracks having a wobbling structure in which the tracks are wobbled at different periods for the respective recording layers, comprising:
   detection means for, in recording the signal on a target recording layer of the signal recording medium, detecting the wobbling period of the track parallel to signal recording; and
   recording operation control means for, upon detecting a change in wobbling period during signal recording, determining on the basis of the detection result that movement from the target recording layer occurs, and stopping the recording operation.

7. A signal recording/reproducing apparatus for recording a signal on a signal recording medium having a plurality of recording layers, each of the recording layers having tracks for recording information, and the tracks having a wobbling structure in which the tracks are wobbled at different periods for the respective recording layers, comprising:
   detection means for, in executing recording/reproducing processing for a target recording layer of the signal recording medium, detecting the wobbling period of the track; and
   operation control means for confirming on the basis of the detection result that the target recording layer is being accessed, and executing processing.

8. An apparatus according to claim 7, wherein said operation control means comprises
   recording operation control means for, in recording the signal on the target recording layer of the signal recording medium, detecting the wobbling period of the track parallel to signal recording, and upon detecting a change in wobbling period during signal recording, determining on the basis of the detection result that movement from the target recording layer occurs, and stopping the recording operation, and reproducing operation control means for, in reproducing the signal from the target recording layer of the signal recording medium, detecting the wobbling period of the track parallel to signal reproduction, and upon detecting a change in wobbling period during signal reproduction, determining on the basis of the detection result that movement from the target recording layer occurs, and stopping the reproducing operation.

9. A signal recording/reproducing apparatus for recording a signal on a signal recording medium having a plurality of recording layers, each of the recording layers having tracks for recording information, and the tracks having a wobbling structure in which the tracks are wobbled at different periods every round, comprising:

detection means for, in executing recording/reproducing processing for a track of an nth round of the signal recording medium, detecting the wobbling period of the track; and operation control means for confirming on the basis of the detection result that the track of the nth round is being accessed, and executing processing.

10. An apparatus according to claim 9, wherein said operation control means comprises recording operation control means for, in recording the signal on the track of the nth round of the signal recording medium, detecting the wobbling period of the track parallel to signal recording, and upon detecting a change in wobbling period during signal recording on the track of the nth round, determining on the basis of the detection result that movement from the track of the nth round occurs, and stopping the recording operation, and reproducing operation control means for, in reproducing the signal from the track of the nth round of the signal recording medium, detecting the wobbling period of the track parallel to signal reproduction, and upon detecting a change in wobbling period during signal reproduction from the track of the nth round, determining on the basis of the detection result that movement from the track of the nth round occurs, and stopping the reproducing operation.

11. A signal recording medium comprising a first recording layer and a second recording layer, the first recording layer having a track for recording information;

the track of the first recording layer having a wobbling structure in which the track is wobbled at a regular period;

the second recording layer having a track for recording information; and the track of the second recording layer having a wobbling structure in which the track is wobbled at modulated periods.

12. A signal recording medium comprising a first recording layer and a second recording layer, the first recording layer having a track for recording information;

the track of the first recording layer having a wobbling structure in which the track is wobbled at a first regular period;

the second recording layer having a track for recording information; and the track of the second recording layer having a wobbling structure in which the track is wobbled at a second regular period different from the first regular period.

13. A signal recording medium comprising a recording layer, the recording layer having a plurality of tracks including a first track and a second track for recording information;

the first track having a wobbling structure in which the first track is wobbled at a regular period; and the second track having a wobbling structure in which the second track is wobbled at modulated periods.

14. A signal recording medium comprising a recording layer, the recording layer having a plurality of tracks including a first track and a second track for recording information;

the first track having a wobbling structure in which the first track is wobbled at a first regular period; and the second track having a wobbling structure in which the second track is wobbled at a second regular period different from die first regular period.

* * * * *